United States Patent [19]
Barker et al.

[11] Patent Number: 5,910,381
[45] Date of Patent: Jun. 8, 1999

[54] CHLORINATED DIETHYL CARBONATE SOLVENT FOR BATTERY

[76] Inventors: Jeremy Barker, 1770 No. Green Valley Pkwy #4021, Las Vegas; Feng Gao, 1050 Whitney Ranch Dr. #1913, Henderson; Arnie Stux, 2362 Green Valley Pkwy #369, Las Vegas, all of Nev. 89014

[21] Appl. No.: 08/843,910

[22] Filed: Apr. 17, 1997

[51] Int. Cl.$^6$ ...................................................... H01M 6/14
[52] U.S. Cl. ........................... 429/197; 429/198; 429/199; 429/122; 361/505; 361/526; 361/527; 252/62.2; 252/182.1; 29/623.1; 29/623.3
[58] Field of Search ...................................... 361/505, 526, 361/527; 252/62.2, 182.1; 429/199, 198, 197, 122; 29/623.1, 623.3

[56] References Cited

U.S. PATENT DOCUMENTS

| | | | |
|---|---|---|---|
| 5,130,211 | 7/1992 | Wilkinson et al. | 429/198 |
| 5,571,635 | 11/1996 | Shu et al. | 429/199 |

OTHER PUBLICATIONS

Dey and Sullivan, "The Electrochemical Decomposition of Propylene Carbonate on Graphite" *J. Electrochem. Soc.,* 117 (2), pp. 222–224 (1970) No month available.

Shu et al., "Effect of 12 Crown 4 on the Electrochemical Intercalation of Lithium into Graphite" *J. Electrochem. Soc.,* 140(6), p. L101–103 (1993) no month available.

Shu et al., "Use of Chloroethylene Carbonate as an Electrolyte Solvent . . . " *J. Electrochem. Soc.,* 142(9), p. L161–2 (1995) No month available.

Shu et al., "Use of Chloroethylene Carbonate as an Electrolyte Solvent for a Graphite Anode . . . " *J. Electrochem. Soc.,* 143(7), p. 2230–35 (1996) No month available.

Shu et al., "Use of Chloroethylene Carbonate as an Electrolyte Solvent . . . ", *J. Electrochem. Soc.,* 143:7 (Jul. 1996) pp. 2230–2235.

Shu et al., "Use of Chloroethylene Carbonate as an Electrolyte Solvent . . . ", *J. Electrochem. Soc.,* 142:9 (Sep. 1995) pp. L161–2.

*Primary Examiner*—Bruce F. Bell

[57] ABSTRACT

The subject invention discloses a novel electrolyte for a solid battery system. Specifically, an electrolyte solvent of chlorinated diethyl carbonates demonstrate good electrochemical stability in conjunction with specific anode and cathode materials. When used with a propylene carbonate co-solvent, it reduces or eliminates the decomposition of propylene carbonate during the first cycle. It is appropriate with a variety of electrolyte salts, and especially with $LiBF_4$. Chloro-substituted diethyl carbonates also show good high and low temperature performance in electrochemical cells.

24 Claims, 4 Drawing Sheets

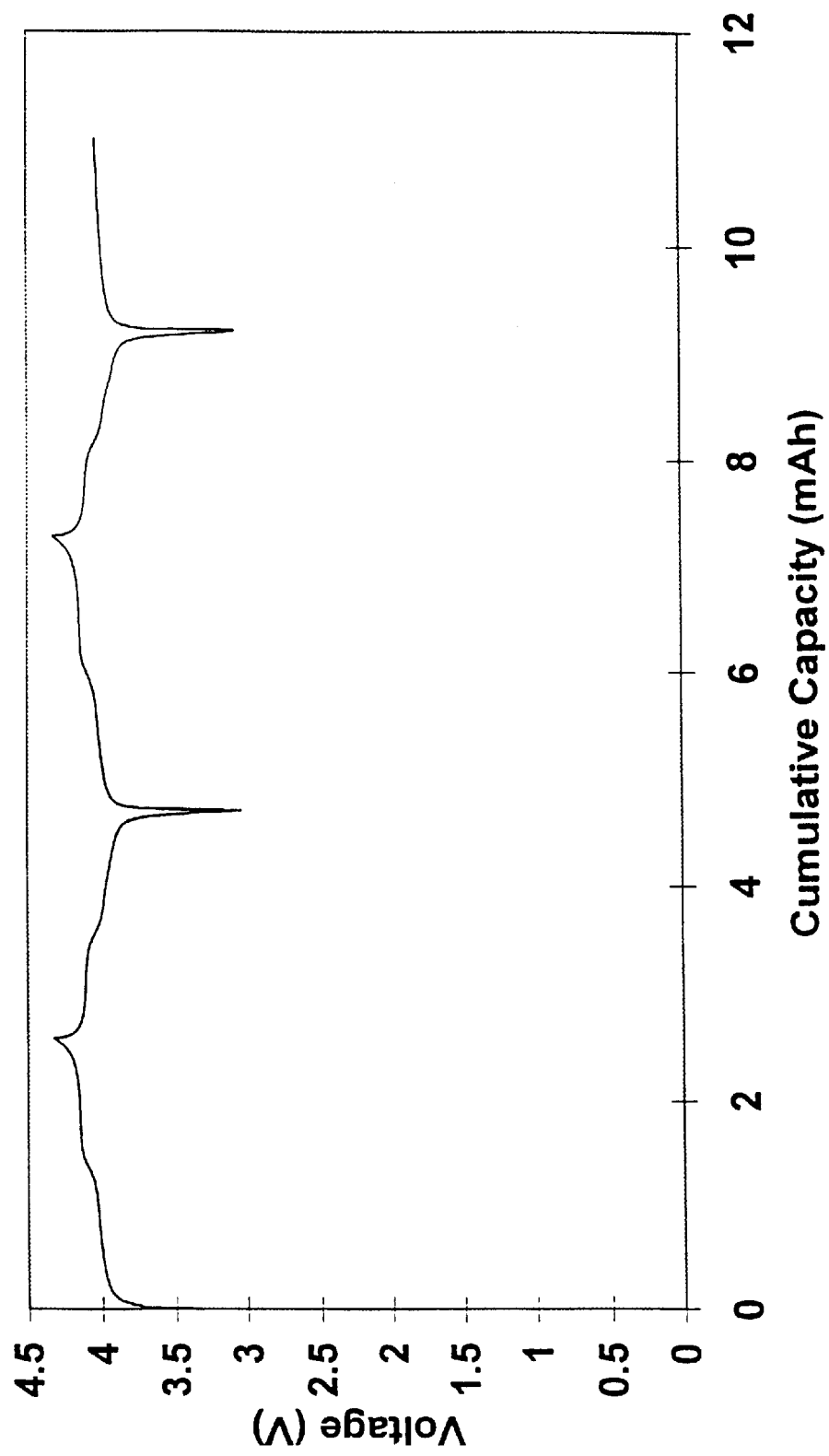
Figure 2. Cell Voltage vs. Cumulative Capacity with Constant Current Cycling; Li/LMO in 1 M LiBF4 Cl-DEC/EC/PC (2:1:1 wt.)

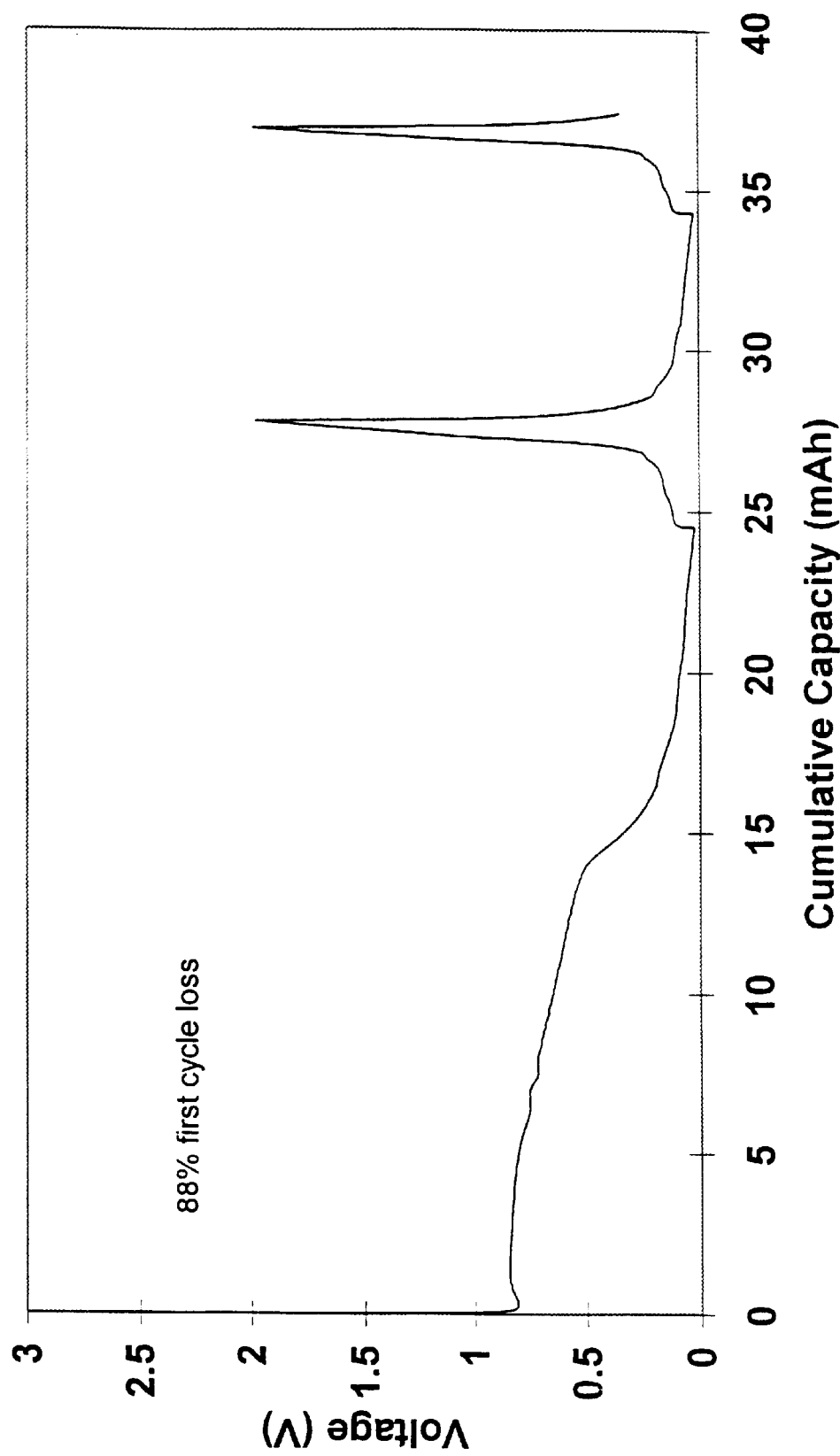

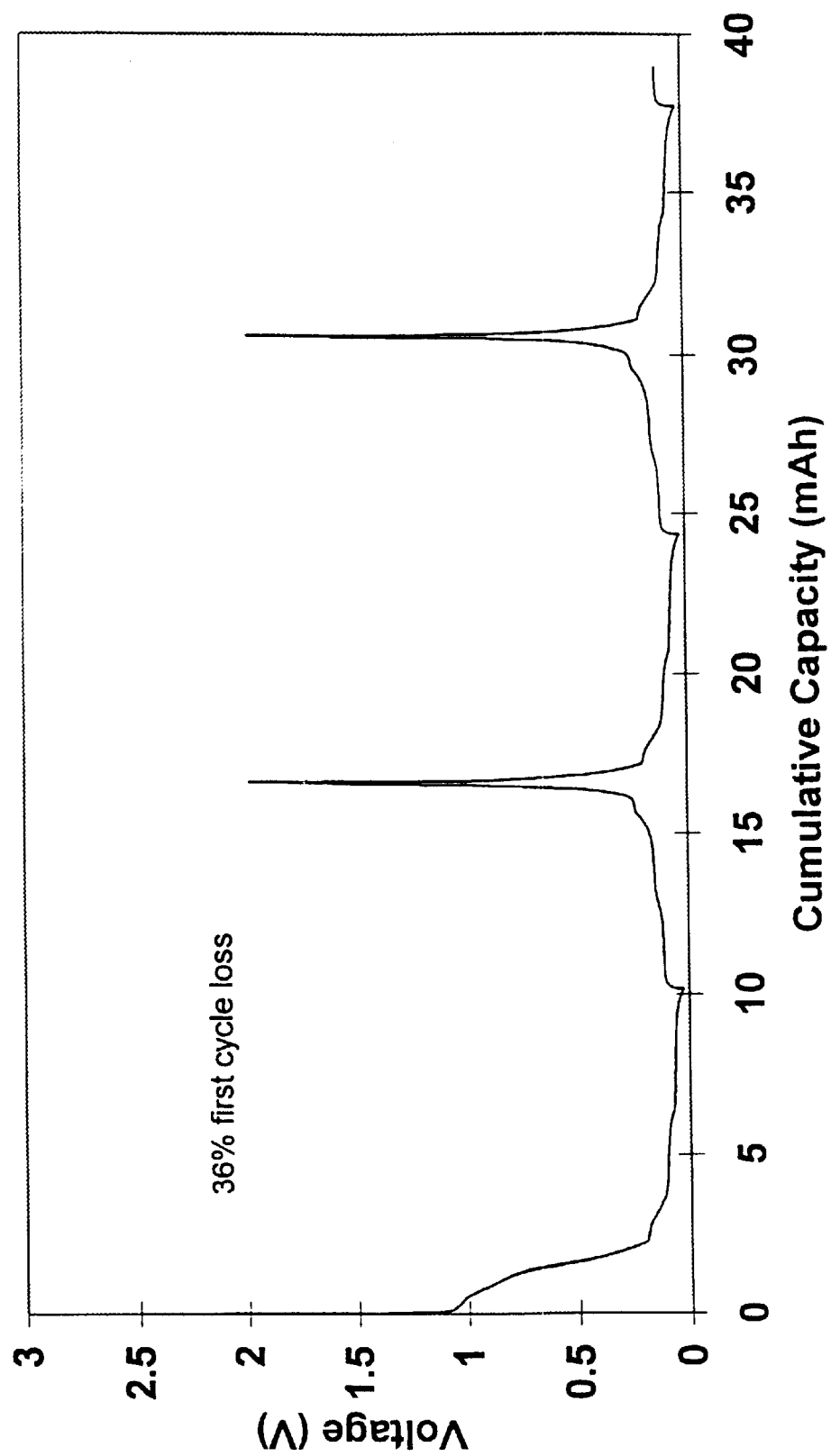
Figure 4. Cell Voltage vs. Cumulative Capacity with Constant Current Cycling; Li/BG 35 in 1 M LiBF4 Cl-DEC/EC/PC (10:45:45 wt.)

CHLORINATED DIETHYL CARBONATE SOLVENT FOR BATTERY

TECHNICAL FIELD

This invention relates generally to electrochemical cells, and, more specifically, to non-aqueous electrochemical cells demonstrating improved performance. More particularly, this invention relates to an improved solvent for lithium-containing electrochemical cells.

BACKGROUND OF THE INVENTION

Lithium electrochemical cells containing an anode, a cathode, and a solvent-containing electrolyte are known in the art. Such cells typically include an anode of metallic lithium or a lithium-inserting compound; a lithium electrolyte prepared from a lithium salt dissolved in one or more organic solvents; and a cathode of an electrochemical active material, typically a chalcogenide of a transition metal.

During discharge, lithium ions from a lithium metal anode pass through the liquid electrolyte to the electrochemically active material of the cathode, where the ions are taken up with the simultaneous release of electrical energy. During charging, the flow of ions is reversed so that lithium ions pass from the electrochemically active cathode material through the electrolyte and are plated back onto the lithium anode.

When lithium metal anodes are replaced with a carbon anode such as coke or graphite, they are intercalated with lithium ions to form $Li_xC$. In operation of the cell, lithium passes from the carbon through the electrolyte to the cathode, where it is taken up just as in a cell with a metallic lithium anode. During recharge, the lithium is transferred back to the anode, where it reintercalates into the carbon. Because no metallic lithium is present in the cell, melting of the anode does not occur even under abuse conditions. And because lithium is reincorporated into the anode by intercalation rather than by plating, dendritic and spongy lithium growth does not occur.

Solid, secondary batteries typically comprises several electrochemical cells. The current from each of the cells is accumulated by a conventional current collector so that the total current generated by the battery is roughly the sum of the current generated from each of the individual electrochemical cells employed in the battery.

U.S. Pat. No. 5,456,000, which is incorporated by reference in its entirety, discloses the formation of electrochemical cell electrodes and separator elements. The electrodes and separator elements use a combination of a poly(vinylidene fluoride) copolymer matrix and a compatible organic solvent plasticizer to provide battery component layers, each in the form of a flexible, self-supporting film.

An electrochemical cell precursor, such as a rechargeable battery cell precursor, is constructed by means of the lamination of electrode and separator cell elements which are individually prepared. Each of the electrodes and the separator is formed individually, for example by coating, extrusion, or otherwise, from compositions including the copolymer materials and a plasticizer. The materials are then laminated to form an electrochemical cell, as shown in FIG. 1.

In the construction of a lithium-ion battery, for example, a copper grid may comprise the anodic current collector 110. An anode (negative electrode) membrane 112 is formed by providing an anodic material dispersed in a copolymer matrix. For example, the anodic material and the copolymer matrix can be provided in a carrier liquid, which is then volatilized to provide the dried anode membrane 112. The anode membrane 112 is positioned adjacent the anodic current collector 110.

A separator membrane 114 is formed as a sheet of a copolymeric matrix solution and a plasticizer solvent. The separator membrane 114 is placed adjacent the anode membrane 112.

A cathode (positive electrode) membrane 116 is similarly formed by providing a cathodic material dispersed in a copolymer matrix. For example, the cathodic material and the copolymer matrix can be provided in a carrier liquid, which is then volatilized to provide the dried cathode membrane 116. The cathode membrane 116 is then overlaid upon the separator membrane layer 114, and a cathodic current collector 118 is laid upon the cathode membrane.

The assembly is then heated under pressure to provide heat-fused bonding between the plasticized copolymer matrix components and the collector grids. A unitary flexible battery precursor structure is thus produced.

During processing of the battery precursor, a large quantity of a homogeneously distributed organic plasticizer is present in the solid polymeric matrix. Prior to activation of the battery, however, the organic solvent is removed using an extraction process. Extraction is generally accomplished using repeated contact with an extracting solvent such as diethyl ether or hexane, which selectively extracts the plasticizer without significantly affecting the polymer matrix. This produces a "dry" battery precursor substantially free of plasticizer and which does not include any electrolyte solvent or salt. An electrolyte solution containing an electrolyte solvent and an electrolyte salt is imbibed into the "dry" battery polymer membrane structure to yield a functional battery system. The addition of the electrolyte salt and solvent is the "activation" of the battery.

Diethyl carbonate (DEC) is a material which is known for use as an electrolyte solvent. It has a boiling point of 126° C., and a melting point of about −43° C. While DEC is an otherwise excellent electrolyte solvent, the limited useful temperature range it exhibits limits its use. It would be desirable to find a material which is an efficient electrolyte solvent, is electrochemically stable, and which functions at elevated and / or reduced temperatures when compared to DEC. It is also necessary to find electrolyte solvents which are compatible with anode active and cathode active materials, and with the electrolyte salt used.

Propylene carbonate (PC) is another material which has been used as an electrolyte solvent. However, the use of propylene carbonate has been limited with the advent of improved electrode materials. For example, graphite has been used as an electrode material in a variety of lithium ion battery systems due to its high capacity, and to its low and flat voltage curve with respect to lithium metal. Initial efforts to use propylene carbonate in a graphite system met with only limited success. A major problem in using graphite as an electrode in a lithium ion cell with propylene carbonate based electrolyte systems is massive electrolyte decomposition during the first lithiation process. It is generally understood that propylene carbonate decomposes on the surface of graphite (Dey and Sullivan, "The Electrochemical Decomposition of Propylene Carbonate on Graphite", *J. Electrochem. Sci.*, p 222–224, 1970). This results in a very high first cycle capacity loss and reduces the apparent cell capacity of cells using a propylene carbonate-based electrolyte solution. Cycle life is reduced.

Efforts to use graphite and propylene carbonate-based electrolytes within the same battery system have focused on supplying both excess lithium and excess electrolyte within the cell. Such cells can, for example, "front-load" the battery by prelithiating the anode, cathode, and/or electrolyte, so that propylene carbonate decomposition does not deplete electrolyte and cause the battery to fail.

It would therefore be desirable, in view of the limitations of the prior art, to provide an electrolyte solution which exhibits an extended functional temperature range, and/or which reduces or eliminates the decomposition of propylene carbonate during the first lithiation process.

SUMMARY OF THE INVENTION

The invention herein uses a chloro-substituted diethyl carbonate (Cl-DEC) in a concentration of from about 2% to about 75% in the electrolyte solution of an electrochemical cell.

The specific boiling and melting points of chloro-substituted diethyl carbonate (Cl-DEC) will vary with the specific location(s) and number of chloride substitutions of the DEC moiety. Generally, Cl-DECs demonstrate a boiling point in the range of approximately 150 to 300° C. and a melting point in the range of approximately −45 to −−70° C.

The use of Cl-DEC as a solvent component in the electrolyte shows some specific and unexpected results when compared to standard electrolytes. As noted above, Cl-DEC exhibits a melting point which is lower than that of DEC, and a boiling point which is higher that that of DEC. A Cl-DEC electrolyte solvent can be used to extend the effective functional temperature range of a battery.

In addition, Cl-DEC significantly reduces electrolyte decomposition of propylene carbonate during the first lithiation process by formation of a passivation layer upon the graphite electrode. As a result, the reversible capacity and cycle life of cells with a Cl-DEC:PC solvent component are substantially enhanced when compared to propylene carbonate cells which do not include a Cl-DEC solvent.

Cl-DEC has demonstrates reasonable electrochemical stability with LMO cathode materials, and with BG-35 anode materials. The Cl-DEC electrolyte solvent shows good stability with electrolyte salts, and particularly with $LIBF_4$ electrolyte solutions.

Cl-DEC is present in the electrolyte in a concentration of from about 2% to about 75%. The remainder of the electrolyte solvent is a solvent such as those known in the art. For example, solvents such as propylene carbonate (PC), ethylene carbonate (EC), butylene carbonate (BC), vinlyene carbonate (VC), diethyl carbonate (DEC), ethyl methyl carbonate (EMC), dipropylene carbonate (DPC), halogenated carbonates, acetates, glymes, and low molecular weight polymers such as polycarbonates, polyacrylates, or polyesters, and mixtures of such solvents can be used as a solvent in conjunction with Cl-DEC. In one preferred embodiment when a $LiBF_4$ salt is used in the electrolyte, the electrolyte solvent is a mixture of Cl-DEC:EC:PC.

BRIEF DESCRIPTION OF THE DRAWINGS

FIGS. 2 through 4 display the capacity vs. cell voltage over a charge/discharge cycle for electrochemical half cells which include a Cl-DEC of the subject invention, and a control cell which does not include a Cl-DEC.

The Figures are drawn for clarity and are not drawn to scale. Similar numbers refer to similar structures throughout the Figures.

DETAILED DESCRIPTION OF THE INVENTION

Figure 1:
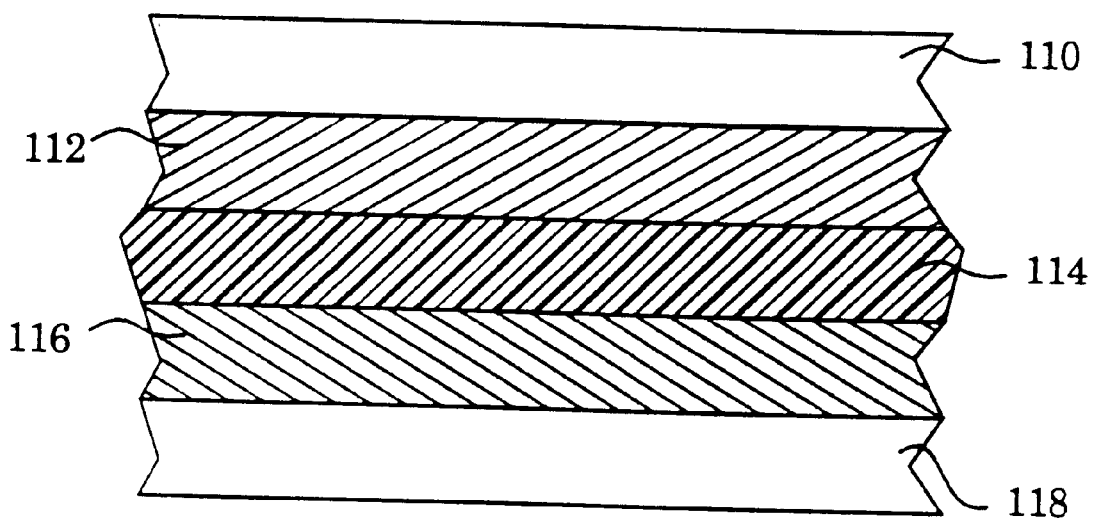
FIG. 1 shows a cross-sectional view of a typical battery of the prior art, including anode, cathode, solid electrolyte separator, and current collectors.

A solid, secondary electrochemical cell of the subject invention includes an anode and a cathode, and, interposed functionally therebetween, an ion-conducting electrolyte. Generally in electrochemical cells of the subject invention, the ion-conducting electrolyte is permeated throughout the structures of each of the anode, the cathode, and an interposed separator such as a polymeric electrolyte film.

An electrochemical cell precursor is formed when the anode film, the separator, and the cathode film are laminated together. Each of the anode film and the cathode film may include a current collector. The cell precursor is activated when an electrolyte solution containing an inorganic salt and an electrolyte solvent are placed within the porous portions of the cell precursor. Once the electrochemical cell has been activated, it is charged using an external energy source prior to use.

An electrolyte solvent is a solvent included in the electrolyte solution for the purpose of solubilizing alkali salts during operation of the electrochemical cell. It has been unexpectedly discovered that a chloro-substituted diethyl carbonate, having from one to ten substitutions, as part of the electrolyte solvent system provides both superior battery cycling characteristics and an improved temperature range in which the battery is effective.

It is believed, without being bound to any particular theory of operation, that propylene carbonate electrolyte solvent decomposition occurs during the first cell discharge when the electrolyte solvent reacts with the carbonaceous anode material to form a passivating film on the surface of the carbonaceous material that is insoluble in the electrolyte solvent. During this reaction, the electrolyte solvent decomposes and is consumed until all the available surfaces area of the carbonaceous material is coated with the passivating film of the electrolyte solvent decomposition products. The film coating is an ionic conductor for alkali ions, but is an electronic insulator.

The introduction of a chloro-substituted diethyl carbonate into the electrolytic solvent solution reduces or eliminates the decomposition of the propylene carbonate in the solution.

Chloro-substituted diethyl carbonate (Cl-DEC) has the formula $C_5O_3Cl_nH_{(10-n)}$, wherein n is from 1 to 10. Because DEC is a symmetrical molecule, there will be a variety of isomers possible with the substitution of chlorine for one or more hydrogen atoms. For example, mono-substituted Cl-DEC has the isomers:

and

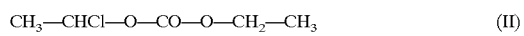

While there will be minor differences in the melting point and boiling point of the two mono-substituted isomers, they will be functionally equivalent. Mono-substituted chloro-diethyl carbonate is commercially available from Fluka Chemical Corp. (Ronkonkoma, N.Y.).

A fully substituted chlorinated diethyl carbonate has the formula:

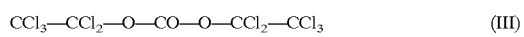

Fully substituted Cl-DEC also has the additional advantage of being a fire retardant material.

Cl-DECs may be obtained commercially, or they may be prepared by conventional means. Chlorine and carbon monoxide are reacted to produce phosgene ($COCl_2$). The phosgene is reacted with a an ethyl alcohol to form an ethyl chlorocarbonate:

$$COCl_2 + R^1OH \rightarrow R^1OCOCl$$

The ethyl chlorocarbonate is reacted with an anhydrous ethyl alcohol to produce a diethyl carbonate:

$$R^1OCOCl + R^2OH \rightarrow R^1OCOOR^2$$

$R^1$ and $R^2$ each has two carbon atoms, and can each have from zero to five chlorine atoms. However, at least one of $R^1$ and $R^2$ must include one or more chlorine atoms in order to produce a chloro-substituted diethyl carbonate of the subject invention.

The electrolyte solvent of the subject invention preferably includes from about 2% to about 75% of the Cl-DEC. The remainder of the electrolyte solvent is a co-solvent. The co-solvent may comprise a single solvent, or may comprise a combination of electrolyte solvents.

The electrolyte co-solvent can be any compatible, relatively non-volatile, aprotic, relatively polar solvent. Preferably these materials have boiling points greater than about 85° C. to simplify manufacture and increase the shelf life of the electrolyte/battery. Typical examples of solvents are dimethyl carbonate (DMC), diethyl carbonate (DEC), propylene carbonate (PC), ethylene carbonate (EC), methyl ethyl carbonate (MEC), gamma-butyrolactone, triglyme, tetraglyme, dimethylsulfoxide, dioxolane, sulfolane, and the like, and mixtures of such materials. U.S. patent application, Ser. No. 08/630,402, which discloses such materials, is incorporated herein.

It has been determined that a system comprising ethylene carbonate (EC) and propylene carbonate (PC) can be used as an effective co-solvent. Generally, a 1:1 solution of EC:PC is preferred as the co-solvent.

The specific co-solvent preferred with be based in part upon physical characteristics of the solvents. For example, the boiling point and melting points of some solvents are as shown:

|  | EC | PC | DMC | DEC | Cl-DEC* |
|---|---|---|---|---|---|
| Boiling Temp. (° C.) | 248 | 240 | 91 | 126 | 150 to 300 |
| Melting Temp. (° C.) | 40 | −49 | 5 | −43 | −45 to −70 |

*Range includes chloro-substitutions from $C_5O_3H_9Cl$ to $C_5O_3Cl_{10}$.

The co-solvent or co-solvent system will also be chosen for stability with the Cl-DEC and with the electrolyte salt employed. Electrolyte salts are those inorganic salts which are suitable for use in a non-aqueous electrolyte. Particularly useful are alkali salts wherein the cation of the salt is an alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known to the art. For example, $LIBF_4$, $LiPF_6$, $LiSCN$, $LiAsF_6$, $LiClO_4$, $LiN(CF_3SO_2)_2$, $LiCF_3SO_3$, $LiSbF_6$, $NaSCN$, and the like, may be used. The electrolyte salt typically comprises from about 5 to about 25 weight percent of the inorganic ion salt based on the total weight of the binary electrolyte. Preferably, the salt is from about 10 to 20 weight percent. The weight percent of the salt depends on the type of salt and upon the specific preferred electrolyte solvent employed.

A preferred electrolyte salt is a lithium salt, $LiBF_4$, in a final concentration of approximately 8 to 15 wt % based upon the total weight of the electrolyte.

The electrolyte salt must be electrochemically stable in the electrolyte solvent, and must not substantially degrade the anode, cathode, and other battery components. A preferred electrolyte salt for use with Cl-DEC is $LiBF_4$. It has been found that dramatic color change of the electrolyte solution can correspond to electrochemical instability between the electrolyte salt and the electrolyte solvent. Therefore, color change can be used as a preliminary test for stability of the salt and solvent solutions. Color changes for some Cl-DEC electrolyte solutions are shown in Table I.

TABLE 1

| Cl-DEC* | Co-Solvent | Salt | Color Change | Electrolyte Negatively Affected |
|---|---|---|---|---|
| 10% | EC:DMC, 2:1 | 1M $LiPF_6$ | Dark yellow after 5 min. Dark brown after 24 hours | Yes |
| 10% | EC:DMC 2:1 | 1M $LiBF_4$ | Slight after 24 hours | No |
| 2% | EC:PC 1:1 | 1M $LiBF_4$ | None after 1 week | No |
| 2.5% | EC:PC 1:1 | 1M $LiBF_4$ | None after 1 week | No |
| 10% | EC:PC 1:1 | 1M $LiBF_4$ | None after 1 week | No |
| 50% | EC:PC 1:1 | 1M $LiBF_4$ | Clear olive green after 24 hours, no further change after that | No |
| 50% | EC | 1M $LiBF_4$ | Clear green after 24 hours | No |
| 75% | EC:PC 1:1 | 1M $LiBF_4$ | Clear green after 24 hours | No |

*Mono-substituted Cl-DEC

Because many electrolyte salts are sensitive to moisture or other chemical compounds, the activation of the electrochemical cell precursor preferably takes place in an inert, moisture-free atmosphere, such as under an argon atmosphere. Electrochemical cells and cell precursors are preferably packaged for storage in moisture-impermeable packaging.

In the present invention, the anode includes graphite or coke. While both natural and synthetic graphites can be used, synthetic graphites which are preferred for the anode are highly structured, highly crystalline, aniosotropic, and have a nearly perfect layered structure. The are formed by, for example, heat treatment up to about 3,000° C. Examples are the SFG and KS series of synthetic graphites (for example, SFG-6™, SFG-10™, SFG-15™, and KS-15™) available from Lonza G. & T., Ltd., Sins, Switzerland. An appropriate flake natural graphite is also available from Superior Graphite Co., Chicago, Ill., as BG-35™. F-399™ is a natural graphite which is appropriate for use, available from Alumina Trading Co., Park Ridge, N.J.

Preferred anodic graphites have an interlayer distance spacing of 002 planes ($d_{002}$) as determined by x-ray diffraction of about 0.335 nm to 0.336 nm. The crystalline size in the direction of c-axis ($L_c$) is greater than about 90 nm and less than about 1000 nm. The BET surface area is greater than about 1 $m^2/g$, and generally is up to about 25 $m^2/g$.

The degree of graphitization is a parameter of the microstructure of the carbonaceous material having a numerical value between 0 and 1.0. In general, carbon having a high degree of graphitization (greater than 0.5, more preferably greater than 0.8) has a more ordered microstructure, more closely resembling the microstructure of graphite. Carbon having a low degree of graphitization has a less ordered microstructure more closely resembling that of coke. Carbon having a high degree of graphitization provides significant advantages with respect to charge capacity and also with respect to variation of cell voltage with state of charge during operation. The degree of graphitization is a value, g, according to the formula:

$$g = \frac{3.45 - d_{(002)}}{0.093}$$

Although other anode materials may be used in addition to graphite or coke, in preferred embodiments, the anode active material consists essentially of graphite, coke, or a mixture thereof. Preferred cokes include, for example, those available as MCMB 2510™ from Osaka Gas Co., Japan. Such cokes include a BET surface area of 0.92 $m^2/g$, a density of 2.0 $g/cm^3$, and a particle size less than 25 $\mu m$. MGC™ cokes from Mitsubishi Gas Co., Japan, with a density of 1.6 $g/cm^3$, and a particle size less than 17 $\mu m$ are also preferred.

The cathode materials include a cathode active material and a polymer matrix. The active cathode materials include, for example, $Li_xMn_2O_4$, $LiCoO_2$, $LiNiO_2$, and other such materials well known to the art. In a preferred embodiment, the cathodic material is mixed with electroconductive material such as graphite, powdered carbon, powdered nickel, metal particles, conductive polymers, or the like. A preferred electroconductive material is Super-P™ from M.M.M. Carbon, Willebrock, Belgium.

Electrolyte solvents and electrolyte solutions of the subject invention are useful in lithium-ion battery systems. The Examples, below, show some general guidelines for a production of a lithium battery and the chlorinated diethyl carbonate of the subject invention. Variations in the materials and methods will be apparent to those skilled in the art.

EXAMPLE 1

Cathode Current Collector

A cathode generally includes a current collector laminated with a positive electrode active film material. Preferably an aluminum foil sheet, open mesh, expanded metal, woven or non-woven or knitted wire fabric or grid is used. Materials suitable for cathodic current collectors are known to the art, and are typically comprised of an electron conductive material such as metals or alloys. The cathode current collector is typically of aluminum, stainless steel, and such foils having a protective conductive coating foil. Preferably the cathode current collector is a sheet or grid of aluminum. Preferably, the current collector has a thickness from about 100 $\mu m$ to about 250 $\mu m$, more preferably about 110 $\mu m$ to about 200 $\mu m$, and most preferably about 125 $\mu m$ to about 175 $\mu m$. Each current collector is also connected to a current collector tab which extends from the edge of the current collector. In batteries comprising multiple electrochemical cells, the cathode tabs are preferably welded together and connected to a lead. External loads can be electrically connected to the leads. Current collectors and tabs are described in U.S. Pat. Nos. 4,925,752; 5,011,501; and 5,326,653, each of which is incorporated herein. An adhesion promoter can be used to facilitate bonding between the cathode material and the cathodic current collector.

An aluminum grid used for the anode current collector was a sheet of expanded aluminum metal about 50 $\mu m$ thick. It is available under the designation 2Al05-077 (flattened and annealed) (Delker, Branford, Conn.).

The surface of the aluminum grid is prepared by etching the grid in a series of solutions. Specifically, the aluminum grid is placed into an acetone bath for 5 minutes. It is then rinsed in water for 1 to 2 minutes. The aluminum grid is then dipped in an etch bath solution comprising 28 grams of potassium hydroxide pellets which have been dissolved in 500 mL of methanol. The aluminum grid is removed from the etch solution after 8 minutes, and placed in a fresh water bath for 8 minutes, followed by an acetone bath for 3 minutes.

An adhesion promoter layer is prepared as a dispersed colloidal solution. A grid coating is formed by adding 100 parts (by weight) ethanol, 100 parts Morton Adcote 50C12, and 5 parts Super P™ into a ball mix jar, and mixed for one hour. The dispersed colloidal solution is diluted in 100 parts ethanol and spray coated onto the etched aluminum grid.

EXAMPLE 2

Porous Cathode Structure

The positive electrode is the cathode during discharge. Typical cathode active materials are known to the art, and include insertion compounds, i.e., any material which functions as a positive pole in a solid electrochemical cell. For lithium ion applications, these are normally characterized as containing all the lithium for the cell. Preferable cathodic materials de-intercalate lithium at a high voltage when contrasted to lithium, making them stable in air. Typical cathodic materials include, by way of example, transition metal oxides, sulfides, and selenides. Such materials include oxides of cobalt, manganese, molybdenum, and vanadium; sulfides of titanium, molybdenum, and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCo_{0.5}Ni_{0.5}O_2$, and the like.

In a preferred embodiment, the cathodic material is mixed with an electroconductive material such as graphite, powdered carbon, powdered nickel, metal particles, conductive polymers, and the like. The cathode is preferably produced using a polymeric binder to form the positive cathodic film, i.e., a solid polymeric matrix provides part of the structure of the cathode. As with the polymeric separator, the polymeric binder is formed using both a solid-polymer-forming material and a plasticizer compound. Polymeric binder materials also find use as the polymeric separator film, as described herein.

The specific carrier liquid for the electrode paste will vary with the desired process parameters. When the carrier liquid is removed by drying, the carrier liquid is preferably a volatile liquid which is chemically inert to the particulates suspended therein. Suitable carrier liquids are well known to the art, and include acetone, xylene, alcohols, and the like.

The cathodic electrode of the subject invention usually comprises a cathode film laminated onto one or both sides of the cathodic current collector. Typically, the cathode film is from about 100 $\mu$m to about 200 $\mu$m thick. Preferably, each anode film is about 130 $\mu$m to about 175 $\mu$m, and more preferably about 140 $\mu$m to 165 $\mu$m, in thickness.

A cathode slurry is prepared by preparing a binder solution, a plasticizer solution, a cathode active powder mixture, and blending the three mixtures together. After mixing, the slurry is cast onto glass to form a free-standing electrode film which is laminated onto the treated current collector of Example 1.

The binder solution is prepared by mixing 26.7 grams of KYNAR™ Flex 2801 (an 88:12 copolymer of polyvinylidene difluoride (PVdF) and hexafloropropylene (HPF)), into 333.3 grams of electronic grade acetone. The mixture is stirred for about 4 hours with a magnetic stir bar. The copolymer functions as the binder for the cathode active materials.

The plasticizer solution is prepared by dissolving 26.0 grams of ethylene carbonate into 26.0 grams of propylene carbonate. The solution is heated to approximately 45° C. and stirred with a magnetic stir bar for 4 hours to bring the ethylene carbonate into solution. The plasticizer gives the electrode structural stability during electrode formation and creates the porosity needed for electrolyte penetration when the cell is activated.

The cathode active powder mixture is prepared by adding 173.4 grams of $Li_xMn_2O_4$ (Kerr McGee, Silver Springs, Id.) to 14.7 grams of SUPER-P™ carbon black (M.M.M. Carbon, Willebrock, Belgium), into a milling jar and rotating for 4 hours on a "roller type" jar mill. A suitable jar mill is Model CZ-92240 (U.S. Stoneware, Mahwah, N.J.). The $Li_xMn_2O_4$ acts as the lithium source for the battery while the carbon aids in electrical conduction.

The three mixtures (binder, plasticizer, and cathode active mixtures) are mixed in a high shear mixer to disperse the active powders and form a slurry. A suitable mixer is Model ME 100DLX (Ross, Haupppauge, N.Y.). The binder solution is first added to the Ross mixing pot, followed by the plasticizer solution. The mixer is turned on to a setting of 200 rpm. The active powder mixture is added to the mixing pot while the solution is stirring to disperse the powders. The slurry is then mixed at a setting of 700 rpm for 45 minutes to form a well-mixed slurry.

The cathode slurry is cast onto glass and coated using a doctor blade set an a gap thickness of approximately 26 mil. As the acetone evaporates, a free-standing electrode film, approximately 7 mil thick is formed. Two cathode films of 24 $cm^2$ with a treated aluminum current collector sandwiched between are laminated with a hot roll laminator to form the cathode electrode.

EXAMPLE 3

Anode Current Collector

The anode commonly includes a current collector laminated with the negative electrode material. Preferably a copper foil sheet, open mesh, expanded metal, woven or non-woven or knitted wire fabric or grid is used. Materials suitable for anodic current collectors are known to the art, and are usually comprised of an electron conductive material such as metals or alloys. Typical materials include nickel, iron, stainless steel, or copper. Preferably, the current collector has a thickness from about 100 $\mu$m to about 250 $\mu$m, more preferably about 110 $\mu$m to about 200 $\mu$m, and most preferably about 125 $\mu$m to about 175 $\mu$m. Each current collector is also connected to a current collector tab which extends from the edge of the current collector. In batteries comprising multiple electrochemical cells, the anode tabs are preferably welded together and connected to a nickel lead. External loads can be electrically connected to the leads. Current collectors and tabs are described in U.S. Pat. Nos. 4,925,752; 5,011,501; and 5,326,653, each of which is incorporated herein. An adhesion promoter can be used to facilitate bonding between the anode material and the anodic current collector.

A copper grid used for the anode current collector was a sheet of expanded copper metal about 50 $\mu$m thick. It is available under the designation 2Cu5-155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (35 ml 70% nitric acid and 500 mL of water). The copper grid is removed from the etch solution after 5 minutes, and placed in a fresh water bath for 8 minutes, followed by an acetone bath for 3 minutes.

An adhesion promoter layer is prepared as described above, and spray coated onto the etched copper grid.

EXAMPLE 4

Porous Anode Structure

The negative electrode is the anode during discharge. Typical anode active materials are well known in the art, and include, by way of example, lithium; lithium alloys such as alloys of lithium with aluminum, mercury, manganese, iron, or zinc; intercalation based anodes such as those using carbon or tungsten oxides; and the like. Preferred anodes include lithium intercalation anodes employing carbon materials such as graphite, cokes, mesocarbons, and the like. The anode may also include an electron conducting material such as carbon black.

Carbon intercalation based anodes, such as those suitable for use in the subject invention, include a polymeric binder. That is, a solid polymeric matrix provides part of the structure of the anode. As with the polymeric separator, the polymeric binder is formed using both a solid-polymer-forming material and a plasticizer compound. The polymeric binder is often a film-forming agent which, together with a plasticizer component, is suitable for forming a porous composite sheet for lamination. Polymeric binders which are useful for formation of the anode also find use as the polymeric separator, as described herein.

The anodic electrode of the subject invention usually comprises an anode film laminated onto one or both sides of the anodic current collector. Typically, the anode film is from about 100 $\mu$m to about 250 $\mu$m thick. Preferably, each anode film is about 100 $\mu$m to about 200 $\mu$m, and more preferably about 125 $\mu$m to about 175 $\mu$m, in thickness.

An anode slurry is prepared by preparing a binder solution, a plasticizer solution, an anode active powder mixture, and blending the three mixtures together. After mixing, the slurry is cast onto glass to form a free-standing electrode film which is laminated onto the treated current collector of Example 3.

The binder solution is prepared by mixing 34.0 grams of KYNAR™ Flex 2801 into 292.0 grams of electronic grade acetone. The mixture is stirred for about 4 hours with a magnetic stir bar. The copolymer functions as the binder for the anode active materials.

The plasticizer solution is prepared by dissolving 26.3 grams of ethylene carbonate into 26.3 grams of propylene carbonate. The solution is heated to approximately 45° C. and stirred with a magnetic stir bar for 4 hours to bring the ethylene carbonate into solution. The plasticizer gives the electrode structural stability during electrode formation and creates the porosity needed for electrolyte penetration when the cell is activated.

The anode active powder mixture is prepared by adding 116.4 grams of BG-35™ graphite (Superior Graphite Co., Chicago, Ill.) and 4.5 grams SUPER-P™ carbon black into a milling jar and rotating for 4 hours on a "roller type" jar mill. A suitable jar mill is US Stoneware Model CZ-92240. The graphite acts as the lithium sink for the battery source for the battery while the carbon aids in electrical conduction.

The three mixtures (binder, plasticizer, and anode active mixtures) are mixed in a high shear mixer to disperse the active powders and form a slurry. A suitable mixer is Ross Model ME 100DLX. The binder solution is first added to the Ross mixing pot, followed by the plasticizer solution. The mixer is turned on to a setting of 200 rpm. The active powder mixture is added to the mixing pot while the solution is stirring to disperse the powders. The slurry is then mixed at a setting of 700 rpm for 45 minutes to form a well-mixed slurry.

The anode slurry is cast onto glass and coated using a doctor blade set an a gap thickness of approximately 26 mil. As the acetone evaporates, a free-standing electrode film, approximately 6 mil thick is formed. Two anode films of 24 cm$^2$ with a treated copper current collector sandwiched between are laminated with a hot roll laminator to form the anode electrode.

EXAMPLE 5

Separator

A separator structure is commonly used to space the anode and the cathode apart from one another, while allowing free transmission of ions from one electrode to the other.

A separator structure may be formed from commercially available separators made of glass fiber, porous polypropylene or porous polyethylene. Such separators include Type A/E glass fiber filters (Gelman Sciences, Ann Arbor, Mich.), and Celgard (Hoechst-Celanese Corp., N.Y., N.Y.). However, the separator is preferably a solid polymeric matrix, such as a polymeric electrolyte film or membrane. Suitable polymeric separator film provide a porous structure, permeated with a plasticizer, upon curing or casting. Preferred polymeric separator films are produced using a casting process in which a carrier liquid is removed to form a flexible sheet. An alternate preferred method produces polymeric separator films by extrusion processes.

Suitable curable polymeric matrices are well known in the art, and include solid matrices formed from inorganic polymers, organic polymers, or a mixture of organic polymers with inorganic non-polymeric materials. A preferred solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference. Suitable non-polymeric inorganic materials for use in conjunction with the solid polymeric matrix include, by way of example, β-alumina, silver oxide, lithium oxide, and the like. Suitable inorganic monomers are also disclosed in U.S. Pat. Nos. 4,247,499; 4,388,385; 4,394,280; 4,432,891; 4,414,506; 4,539,276; 4,557,985; 4,925,751; and 4,990,413, each of which is incorporated herein by reference.

If the solid matrix forming material (monomer or partial polymer thereof) employed is cured by radiation polymerization to form a solid matrix, the plasticizer should be radiation inert at least up to the levels of radiation employed. If the solid matrix forming monomer or partial polymer is cured by thermal polymerization, then the plasticizer should be thermally inert at least up to the temperatures of thermal polymerization.

A preferred polymeric matrix is formed by a casting process in which no curing is necessary to form the solid matrix, e.g., using casting or extrusion processes. A preferred method employs a plasticized copolymer of polyvinylidene difluoride (PVdF) and hexafluoropropylene (HFP) dissolved in acetone or another suitable carrier liquid. Upon casting the solution, the carrier liquid is evaporated to form the polymeric separator film. The solution may be cast directly onto an electrode. Alternatively, the solution can be cast onto a substrate, such as a supporting web or solid surface. The solid matrix film is formed as the carrier liquid (e.g., acetone) is removed. The polymeric film can be removed from the surface upon which it was formed in order to facilitate lamination of the battery structure.

An especially preferred polymeric matrix provides a flexible, self-supporting film upon casting. It is formed from a copolymer of polyvinylidene difluoride (PVdF) and hexafluoropropylene (HFP). The copolymer comprises about 75 to 92% (by weight) of the vinylidene difluoride, and about 8 to 25% hexafluoropropylene. Preferably, the copolymer comprises about 80 to 90% of the vinylidene difluoride, and about 10 to 20% hexafluoropropylene. More preferably, the copolymer comprises about 85 to 90% of the vinylidene difluoride, and about 10 to 15% hexafluoropropylene. One especially preferred, commercially available copolymer material is KYNAR™ Flex 2801 (Elf Atochem North America, Philadelphia, Pa.), which provides an 88:12 ratio of PVdF: HFP.

Inorganic filler adjuncts, such as fumed alumina or fumed silica may be used as desired.

13.5 grams of propylene carbonate, 13.5 grams of ethylene carbonate, 31.8 grams KYNAR™ Flex 2801, and 21.6 grams of silanized fumed SiO$_2$ in 264 grams of acetone is mixed, preferably under low-shear conditions. The mixture is cast on a suitable substrate or carrier web. The acetone is evaporated from the cast material to form the polymeric separator film. The polymeric matrix sheet has a thickness of from 2 mil to 2.5 mil, and weighs from 0.21 grams to 0.24 grams per 29 cm$^2$.

EXAMPLE 6

Lamination and Extraction of Electrochemical Cell Precursor

A solid electrochemical cell precursor is formed by first positioning a polymeric separator film of Example 5 between a cathode of Example 2 and an anode of Example 4, and then fusing structures under moderate pressure and temperature (e.g., 130–140° C.).

The plasticizer is extracted from the fused battery precursor. Extraction can be accomplished using conventional organic liquid solvents such as methanol or ether.

The solid electrochemical precursor cell of Example 14 is immersed in a bath of methanol or diethyl ether or in a series of methanol or ether baths, to remove the plasticizer. Preferably, the methanol or ether bath(s) provide at least 30 minutes of contact with an excess of methanol or ether.

The extracted cell precursor is vacuum dried overnight at 40° C., and stored under dry box or anhydrous conditions until the cell is activated using an electrolyte solution.

EXAMPLE 7

Activation of Electrochemical Cell Precursor with EC:DMC

A solid electrochemical cell precursor is prepared according to Example 6. An electrolyte solvent is prepared by combining 59.3 grams of ethylene carbonate, and 29.7 grams of dimethyl carbonate. This produces a 2:1 mixture of EC:DMC. To the electrolyte solvent is added 11 grams of $LiPF_6$ to form an electrolyte solvent solution. The electrolyte solvent solution is added to the extracted cell precursor of Example 6. The activated electrochemical cell is packaged under vacuum and/or using a pressurizing package.

EXAMPLE 8

Activation of Electrochemical Cell Precursor with EC:PC

A solid electrochemical cell precursor is prepared according to Example 6. An electrolyte solvent is prepared by combining 47 grams of ethylene carbonate, and 47 grams of propylene carbonate. This produces a 1:1 mixture of EC:PC. To the electrolyte solvent is added 6.2 grams of $LIBF_4$ to form an electrolyte solvent solution. The electrolyte solvent solution is added to the extracted cell precursor of Example 6. The activated electrochemical cell is packaged under vacuum and/or using a pressurizing package.

EXAMPLE 9

Activation of Electrochemical Cell Precursor with 2% Mono-Substituted Chlorinated Diethyl Ether A solid electrochemical cell precursor is prepared according to Example 6. An electrolyte solvent is prepared by combining 46 grams of ethylene carbonate, 46 grams of propylene carbonate, and 2 grams of mono-substituted Cl-DEC (Fluka). This produces a 1:1 mixture of EC:PC having 2% Cl-DEC. To the electrolyte solvent is added 6.2 grams of $LIBF_4$ to form an electrolyte solvent solution. The electrolyte solvent solution is added to the extracted cell precursor of Example 6. The activated electrochemical cell is packaged under vacuum and/or using a pressurizing package.

EXAMPLE 10

Activation of Electrolytic Cell Precursor with 10% Mono-Substituted Chlorinated Diethyl Ether A solid electrochemical cell precursor is prepared according to Example 6. An electrolyte solvent is prepared by combining 42 grams of ethylene carbonate, 42 grams of propylene carbonate, and 10 grams of mono-substituted Cl-DEC (Fluka). This produces a 1:1 mixture of EC:PC having 10% Cl-DEC. To the electrolyte solvent is added 6.2 grams of $LiBF_4$ to form an electrolyte solvent solution. The electrolyte solvent solution is added to the extracted cell precursor of Example 6. The activated electrochemical cell is packaged under vacuum and/or using a pressurizing package.

EXAMPLE 11

Activation of Electrochemical Cell Precursor with 50% Mono-Substituted Chlorinated Diethyl Ether A solid electrochemical cell precursor is prepared according to Example 6. An electrolyte solvent is prepared by combining 23.5 grams of ethylene carbonate, 23.5 grams of propylene carbonate, and 47 grams of mono-substituted Cl-DEC (Fluka). This produces a 1:1 mixture of EC:PC having 50% Cl-DEC. To the electrolyte solvent is added 6.2 grams of $LiBF_4$ to form an electrolyte solvent solution. The electrolyte solvent solution is added to the extracted cell precursor of Example 6. The activated electrochemical cell is packaged under vacuum and/or using a pressurizing package.

EXAMPLE 12

Activation of Electrolytic Cell Precursor with 75% Mono-Substituted Chlorinated Diethyl Ether A solid electrochemical cell precursor is prepared according to Example 6. An electrolyte solvent is prepared by combining 11.7 grams of ethylene carbonate, 11.7 grams of propylene carbonate, and 70.6 grams of mono-substituted Cl-DEC (Fluka). This produces a 1:1 mixture of EC:PC having 75% Cl-DEC. To the electrolyte solvent is added 6.2 grams of $LiBF_4$ to form an electrolyte solvent solution. The electrolyte solvent solution is added to the extracted cell precursor of Example 6. The activated electrochemical cell is packaged under vacuum and/or using a pressurizing package.

EXAMPLE 13

Activation of Electrochemical Cell Precursor with Poly-Substituted Chlorinated Diethyl Ether A solid electrochemical cell precursor is prepared according to Example 6. An electrolyte solvent is prepared by combining 42 grams of ethylene carbonate, 42 grams of propylene carbonate, and 10 grams of bi-substituted Cl-DEC, prepared by standard means (described above). This produces a 1:1 mixture of EC:PC having 10% bisubstituted Cl-DEC. To the electrolyte solvent is added 6.2 grams of LiBF, to form an electrolyte solvent solution. The electrolyte solvent solution is added to the extracted cell precursor of Example 6. The activated electrochemical cell is packaged under vacuum and/or using a pressurizing package.

EXAMPLE 14

Activation of Electrochemical Cell Precursor with Poly-Substituted Chlorinated Diethyl Ether The process of Example 13 is repeated to produce a series of batteries, each time replacing the bi-substituted Cl-DEC with a poly-substituted Cl-DEC prepared by standard means. The bi-substituted Cl-DEC is replaced, sequentially, with: a tri-substituted Cl-DEC; a tetra-substituted Cl-DEC; a pent-substituted Cl-DEC; a hex-substituted Cl-DEC; a hept-substituted Cl-DEC; an oct-substituted Cl-DEC; a non-substituted Cl-DEC; and a dec-substituted (fully substituted) Cl-DEC.

EXAMPLE 15

Performance of Half-Cells

Lithium metal/graphite or lithium/LMO half cells were built by positioning a glass fiber separator between the electrodes. The carbon electrode active surface was about $11/16$ inch (1.75 cm) in diameter. The cell was carbon electrode or LMO limited. The liquid electrolyte comprised, as noted, an organic solvent mixture of Cl-DEC:EC:PC (2:1:1); 1:1 EC:PC without Cl-DEC; or an organic solvent mixture of 1:1 EC:PC with 10% Cl-DEC.

FIG. 2 shows the cell voltage vs. cathode cumulative capacity for a half cell including the electrolyte of Example 11 under constant current cycling.

FIG. 3 shows the cell voltage vs. anode cumulative capacity for a half cell including the electrolyte of Example 10 under constant current cycling. The half cell demonstrates an 88% first cycle loss.

FIG. 4 shows the cell voltage vs. anode cumulative capacity for a half cell including the electrolyte of Example 10 under constant current cycling. The half cell demonstrates a 36% first cycle loss, an improvement of 52% over the half cell performance shown in FIG. 3.

All materials percentages are weight/weight percent, unless noted otherwise. When a range of values is given to be "about" a certain percentage, each of the upper and lower ranges can be varied by 5 to 10 percent if such variation does not cause detrimental function to the system.

While the invention has been described in connection with several exemplary embodiments, it will be understood that many modifications will be apparent to those of ordinary skill in the art in light of the above disclosure. Reference to the following claims should be made to determine the scope of the claimed invention.

We claim:

1. A method for preparing an electrochemical cell, said method comprising the steps of:
    (a) laminating together an anode, a separator, and a cathode to form an electrochemical cell precursor;
    (b) activating said electrochemical cell precursor of step (a) by introducing an electrolyte solution including a chloro-substituted diethyl carbonate of the formula $C_5O_3Cl_nH_{(10-n)}$, wherein n is from 1 to 10; and an electrolyte salt.

2. A method of claim 1 wherein step (a) further comprises:
    (a) (1) laminating together an anode, a separator, and a cathode to form an electrochemical cell precursor; wherein each of said anode, said separator, and said cathode includes a solid polymeric matrix and a plasticizer material; and
    (2) removing said plasticizer material from said cell precursor.

3. A method of claim 1 wherein said activating step further comprises an electrolyte solvent having from about 2% to about 75% chloro-substituted diethyl carbonate by weight.

4. A method of claim 1 wherein said chloro-substituted diethyl carbonate is $C_5O_3ClH_9$.

5. A method of claim 1 wherein said chloro-substituted diethyl carbonate is a poly-substituted diethyl carbonate.

6. A method of claim 5 wherein said chloro-substituted diethyl carbonate is $C_5O_3Cl_{10}$.

7. A method of claim 1 wherein said activating step further comprises an electrolyte solution including ethylene carbonate and dimethyl carbonate.

8. A method of claim 1 wherein said activating step further comprises an electrolyte solution including ethylene carbonate and propylene carbonate.

9. A method of claim 1 wherein said electrolyte solution includes from about 8 wt % to about 15 wt % of an electrolyte salt.

10. A method of claim 1 wherein said electrolyte solution includes an electrolyte salt selected from the group consisting of $LiPF_6$, $LiSCN$, $LiAsF_6$, $LiClO_4$, $LiN(CF_3SO_2)_2$, $LiBF_4$, $LiCF_3SO_3$, $LiSbF_6$, $NaSCN$, and mixtures thereof.

11. A method of claim 1 wherein said electrolyte salt is $LiBF_4$.

12. An electrolyte solvent for an electrochemical cell, said solvent comprising a chlorinated diethyl carbonate of the formula $C_5O_3Cl_nH_{(10-n)}$, wherein n is from 1 to 10.

13. An electrochemical cell, said cell comprising an anode, a cathode, and an electrolyte solvent interposed between said anode and said cathode; said electrolyte solvent including an electrochemical salt, and an electrolyte solvent including a chloro-substituted diethyl carbonate of the formula $C_5O_3Cl_nH_{(10-n)}$, wherein n is from 1 to 10.

14. An electrochemical cell of claim 13 wherein the electrolyte solvent has from about 2% to about 75% chloro-substituted diethyl carbonate by weight.

15. An electrochemical cell of claim 13 wherein the chloro-substituted diethyl carbonate is $C_5O_3ClH_9$.

16. An electrochemical cell of claim 13 wherein the chloro-substituted diethyl carbonate is a poly-chloro-substituted diethyl carbonate.

17. An electrochemical cell of claim 16 wherein the chloro-substituted diethyl carbonate is $C_6O_3Cl_{10}$.

18. An electrochemical cell of claim 13 wherein the electrolyte solvent further comprises ethylene carbonate.

19. An electrochemical cell of claim 13 wherein the electrolyte solvent further comprises dimethyl carbonate.

20. An electrochemical cell of claim 13 wherein the electrolyte solvent further comprises propylene carbonate.

21. An electrochemical cell of claim 13 wherein the electrolyte solution includes from about 8 wt % to about 15 wt % of an electrolyte salt.

22. An electrochemical cell of claim 13 wherein the electrolyte solution includes an electrolyte salt selected from the group consisting of $LiPF_6$, $LiSCN$, $LiAsF_6$, $LiClO_4$, $LiN(CF_3SO_2)_2$, $LiBF_4$, $LiCF_3SO_3$, $LiSbF_6$, $NaSCN$, and mixtures thereof.

23. An electrochemical cell of claim 13 wherein the electrolyte salt is LiBF.

24. An electrochemical cell of claim 13 further comprising a polymeric separator structure interposed between the anode and the cathode.

* * * * *